(12) United States Patent
Hammerum et al.

(10) Patent No.: US 11,959,460 B2
(45) Date of Patent: Apr. 16, 2024

(54) STOPPING A WIND TURBINE ROTOR USING PRE-SET PITCH RATES

(71) Applicant: VESTAS WIND SYSTEMS A/S, Aarhus N. (DK)

(72) Inventors: Keld Hammerum, Hadsten (DK); Christian Jeppesen, Aarhus C (DK); Jon Sowman, Aarhus N (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 24 days.

(21) Appl. No.: 17/779,114

(22) PCT Filed: Nov. 20, 2020

(86) PCT No.: PCT/DK2020/050315
§ 371 (c)(1),
(2) Date: May 23, 2022

(87) PCT Pub. No.: WO2021/098926
PCT Pub. Date: May 27, 2021

(65) Prior Publication Data
US 2022/0403822 A1     Dec. 22, 2022

(30) Foreign Application Priority Data
Nov. 21, 2019   (DK) .......................... PA 2019 70708

(51) Int. Cl.
*F03D 7/02*     (2006.01)
(52) U.S. Cl.
CPC ......... *F03D 7/0252* (2013.01); *F03D 7/0224* (2013.01); *F05D 2260/70* (2013.01)

(58) Field of Classification Search
CPC ...... F03D 7/0224; F03D 7/024; F03D 7/0264; F05B 2270/309; F05B 2270/328
See application file for complete search history.

(56) References Cited

U.S. PATENT DOCUMENTS 10,823,144 B2 * 11/2020 Hammerum ............ F03D 7/024
2011/0187108 A1    8/2011 Wakasa
(Continued)

FOREIGN PATENT DOCUMENTS

| CN | 109322787 A | 2/2019 |
| EP | 2535574 A1 | 12/2012 |

(Continued)

OTHER PUBLICATIONS

Danish Patent and Trademark Office, 1st Technical Examination including the Search Report for Application PA 2019 70708 dated May 25, 2020.
(Continued)

*Primary Examiner* — Christopher R Legendre
(74) *Attorney, Agent, or Firm* — Patterson + Sheridan, LLP

(57) ABSTRACT

Control of a wind turbine in a stop process where a stop controller is used to pitch the blades at a number of pre-set pitch rates including a first pitch rate and a second pitch rate. The stop controller is arranged to access desired pitch angles of the stopping process and add an envelope band to the desired pitch angles. In the stop process, pitching at a selected pitch rate among the number of pre-set pitch rates is performed, and the pitch rate is changed according to criteria to keep the pitch value within the envelope band.

19 Claims, 4 Drawing Sheets

(56) References Cited

U.S. PATENT DOCUMENTS

2014/0178195 A1    6/2014  Blom et al.
2022/0403821 A1*  12/2022  Hammerum .......... F03D 7/0224
2022/0403822 A1*  12/2022  Hammerum ............ F03D 7/024

FOREIGN PATENT DOCUMENTS

| | | |
|---|---|---|
| KR | 101475274 B1 | 12/2014 |
| WO | 2015003710 A1 | 1/2015 |
| WO | 2021098926 A1 | 5/2021 |

OTHER PUBLICATIONS

PCT, International Search Report for Application PCT/DK2020/050315 dated Sep. 2, 2021.
PCT, Written Opinion of the International Searching Authority for Application PCT/DK2020050315 dated Sep. 2, 2021.

* cited by examiner

US 11,959,460 B2

STOPPING A WIND TURBINE ROTOR USING PRE-SET PITCH RATES

FIELD OF THE INVENTION

The present invention relates to control of a wind turbine, and in particular it relates to using a stop controller to pitch the blades at a number of pre-set pitch rates including a first pitch rate and a second pitch rate,

BACKGROUND OF THE INVENTION

In pitch-controlled wind turbines, in normal operation, the pitch of the wind turbine blades is adjusted in response to the wind conditions, and in order to obtain a desired energy production. A number of situations may arise which lead to a need to a stop the rotor of the turbine, either in a complete shutdown or as a rotor speed reduction. Generally, a stop process is done by pitching out of the wind, i.e. feathering, to reduce the aerodynamic lift on the blades and thereby reducing the rotor speed. The stop process may be a controlled shutdown, e.g. due to service, a shutdown due to high winds, a shutdown due to a fault, an emergency shutdown, a simple rotor speed reduction, or for other reasons. In any case, there is not a single stop process which fits all scenarios, and for that reason a number of different stop processes are described in the art.

WO2006/007838 A1 (Vestas) discloses a solution where the blade velocity is controlled with a high velocity initially, falling to a lower velocity later in the process, further embodiments are discussed where individual pitching is continued during the feathering process.

WO2015/003710 A1 (Vestas) discloses a solution where the individual pitching is maintained to a certain degree after the shutdown command has been received. Here a safety control system takes over the pitching of the blades and by utilizing constant pitch rates, individual pitching is maintained in a manner which emulates individual pitching utilizing constant pitch rates and thereby obtain the asymmetric load mitigation to a certain extent also during the feathering process.

It is against this background that the invention has been devised.

SUMMARY OF THE INVENTION

It is an object of embodiments of the invention to improve a wind turbines ability to address different rotor stop processes in a versatile manner.

Accordingly, in a first aspect, there is provided a method for controlling a wind turbine in response to a rotor stop signal, the wind turbine comprises a rotor with one or more pitch adjustable rotor blades; and wherein upon receiving the rotor stop signal, the rotor speed is reduced by a stop controller controlling the pitch adjustable rotor blades towards a feathering position in a stopping process, and wherein the stop controller is arranged to pitch the blades at a number of pre-set pitch rates including a first pitch rate and a second pitch rate, the second pitch rate being lower than the first pitch rate:
  wherein the method comprises the steps:
  access desired pitch angles of the stopping process;
  add an envelope band to the desired pitch angles by adding a positive value and a negative value thereby defining an upper band value and a lower band value; and wherein the stop controller is arranged to:
  move the pitch adjustable rotor blade at a selected pitch rate among the number of pre-set pitch rates until the pitch angle signal is outside a pitch angle value defined by the envelope band,
  if the pitch angle signal is larger than the upper band value, change the selected pitch rate to a lower pitch rate among the number of pre-set pitch rates, and
  if the pitch angle signal is smaller than the lower band value, change the selected pitch rate to a higher pitch rate among the number of pre-set pitch rates.

In this manner a versatile control method is provided which facilitates that an arbitrary pitch trajectory can be followed during a stopping process by a stop controller with reduced functionality in the sense that it is limited to a number of pre-set pitch rates. By following is meant that the arbitrary pitch trajectory is approximated within the envelope band by the resulting pitch trajectory. In this manner an approximate pitch stopping trajectory is emulated by the stop controller by changing the pitch rate upon reaching the envelope band limits. A wind turbine may be provided with more options for stopping the rotor. For example, a rotor speed reduction option, a slow shutdown option, a fast shutdown option, an emergency shutdown option, etc. Embodiments of the present invention supports such different stopping option in a simple and versatile manner, even for a stopping controller with reduced pitching functionality. Using a stop controller with reduced functionality is advantageous since it facilitates a stop controller which can be built in a robust and reliable manner. In particular for a hydraulic pitch system, pre-set substantial constant pitch rates may be provided by controlling on/off valves, and thereby dispense of a need for proportional valves.

In further aspects, the invention relates to a wind turbine comprising a control system arranged to perform the method according to the first aspect and to a computer program product comprising software code adapted to control a wind turbine when executed on a data processing system, the computer program product being adapted to perform the method of the first aspect.

The computer program product may be provided on a computer readable storage medium or being downloadable from a communication network. The computer program product comprises instructions to cause a data processing system, e.g. in the form of a controller, to carry out the instruction when loaded onto the data processing system.

In general, a controller may be a unit or collection of functional units which comprises one or more processors, input/output interface(s) and a memory capable of storing instructions can be executed by a processor.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which
In FIG. 3 common pitching is illustrated and in FIG. 4 individual pitching is illustrated:

DESCRIPTION OF EMBODIMENTS

Figure 1:
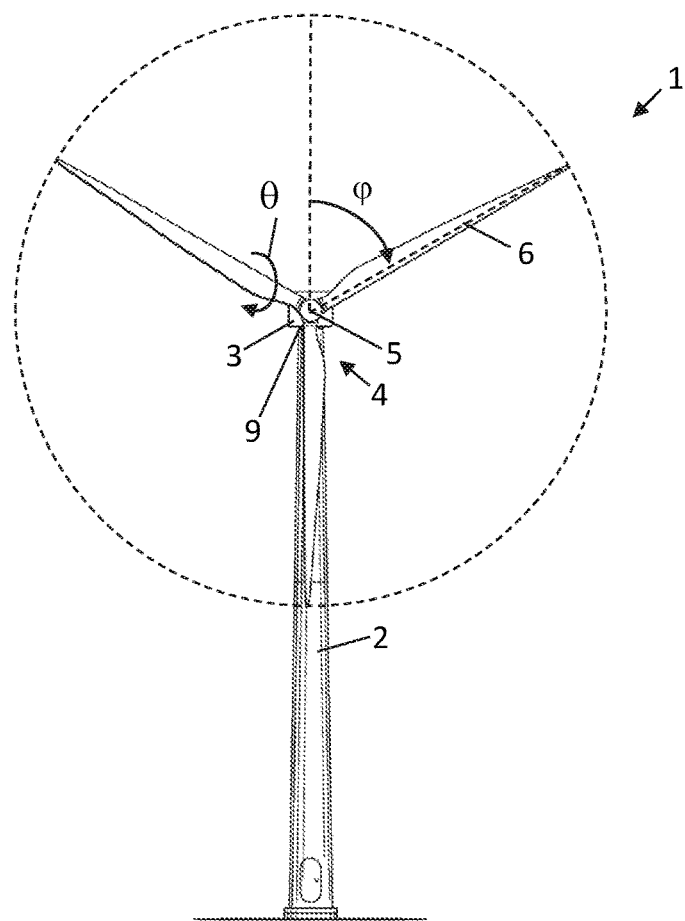
FIG. 1 illustrates, in a schematic view, an example of a wind turbine.

FIG. 1 illustrates, in a schematic view, an example of a wind turbine 1. The wind turbine 1 includes a tower 2, a nacelle 3 placed at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of the wind turbine includes a central hub 5 and a plurality of blades 6 that project outwardly from the central hub 5. In the illustrated embodiment, the rotor 4 includes three blades 6, but the number may vary. Moreover, the wind turbine comprises a control system. The control system may be placed inside the nacelle or distributed at a number of locations inside (or externally to) the turbine and communicatively connected. The rotor blades are pitch-adjustable, here indicated with the pitch angle θ. The rotor blades can be adjusted in accordance with a collective pitch setting, where each of the blades are set to the same pitch value. In addition to that, the rotor blades are adjustable in accordance with individual pitch settings, where each blade may be provided with an individual pitch setpoint. The rotor blades move in a rotor plane, here the angular position of each blade in the rotor plane is made with the azimuth angle φ.

The rotor blades 6 are mechanically connected to an electrical generator, possibly, via gearbox. In direct drive systems, and other systems, the gear box may not be present. The electrical power generated by the generator is injected into a power grid via an electrical converter. The electrical generator and the converter may be based on a full-scale converter (FSC) architecture or a doubly fed induction generator (DFIG) architecture, but other types may be used.

The control system comprises a number of elements, including at least one main controller with a processor and a memory, so that the processor is capable of executing computing tasks based on instructions stored in the memory. In general, the wind turbine controller ensures that in operation the wind turbine generates a requested power output level. This is obtained by adjusting the pitch angle and/or the power extraction of the converter. To this end, the control system comprises a pitch system including a pitch controller using a pitch reference, and a power system including a power controller using a power reference. The power controller controls the various electric components of the generator converter system in order to deliver the requested power, hereunder controls the torque of the generator that is needed to extract the requested power by the rotor from the wind. The control system, or elements of the control system, may be placed in a power plant controller (not shown) so that the turbine may be operated based on externally provided instructions.

Figure 2:
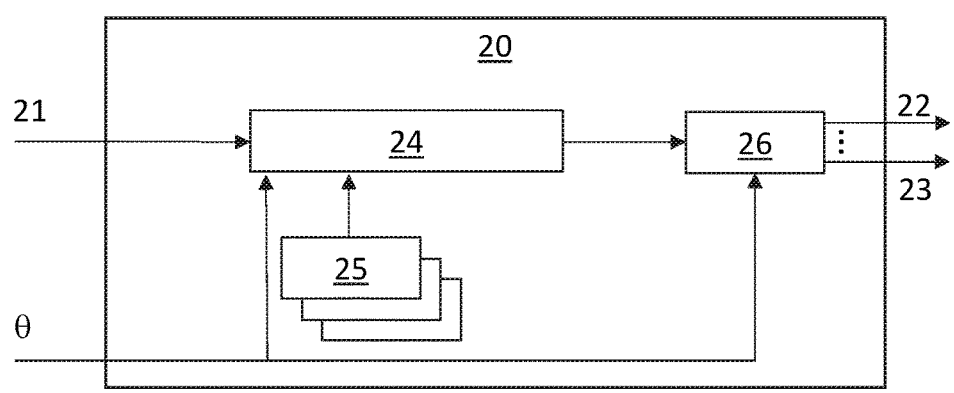
FIG. 2 schematically illustrates a controller unit implemented to control a wind turbine in response to a rotor stop signal.

FIG. 2 schematically illustrates elements of a stop controller unit 20 arranged for controlling a wind turbine in response to a rotor stop signal. The controller unit being implemented with a signal input 21 arranged to receive such rotor stop signal. The stopping processing being obtain by controlling the pitch adjustable rotor blades. i.e. the pitch angle θ of the rotor blades, towards a feathering position based on a pitch signal 22, 23 to be sent to the actuator of the pitch adjustable rotor blades. It is noted that the term stopping the rotor should be construed broadly to encompass both reducing the rotor speed to a lower speed, including a lower controlled speed and an idling speed, as well as reducing the rotor speed to a complete halt. The rotor stop signal may be a shutdown signal. Reference to the feathered position of a wind turbine blade means a selected pre-set angle in the range of 85° to 120° in dependence on the mechanical design of the pitch system. The specific feathered position of a wind turbine is a design choice.

The present invention relates to the situation where the stop process is handled by a stop controller with reduced functionality in the sense that the stop controller is not able to control the pitch at any pitch rate, instead the stop controller is arranged to pitch the blades at a number of pre-set pitch rates including a first pitch rate 22 and a second pitch rate 23, the second pitch rate being lower than the first pitch rate. In the figure this aspect is illustrated by the pitch signals 22, 23, each representing a pitch signal with a given pitch rate. The precise implementation of the interaction between the controller and the pitch actuators of the blades can vary depending on the specific system.

The pitch rates are normally set to be constant. Depending on the system this can be implemented in different manners, including to be constant in degrees per second, i.e. in relation to movement of the angle, and constant in displacement per second, i.e. in relation to piston movement. For a hydraulic system the pitch rate may vary slightly with pressure drop, such variation is understood to fall under the term constant.

Figure 3:
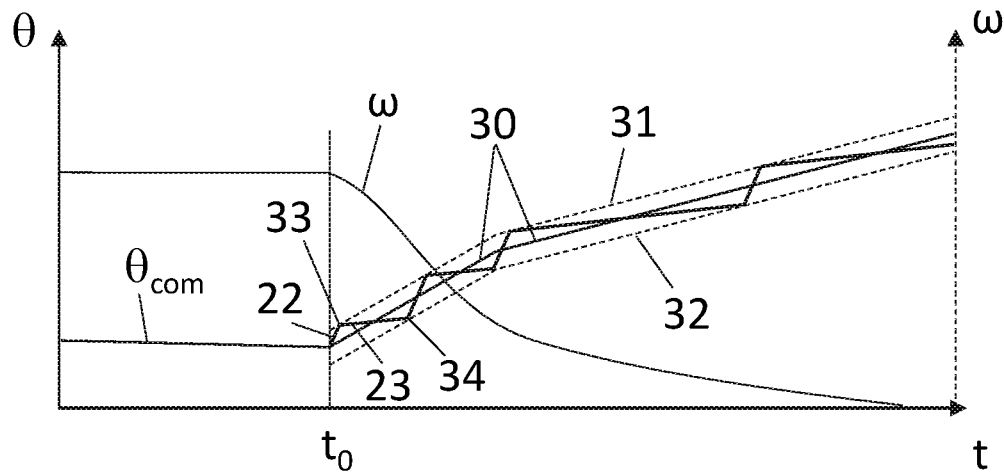
FIGS. 3 and 4 illustrate schematic embodiments of a stopping process, where a stop controller is controlling the pitch adjustable rotor blades towards a feathering position upon receiving a rotor stop signal.
Figure 4:
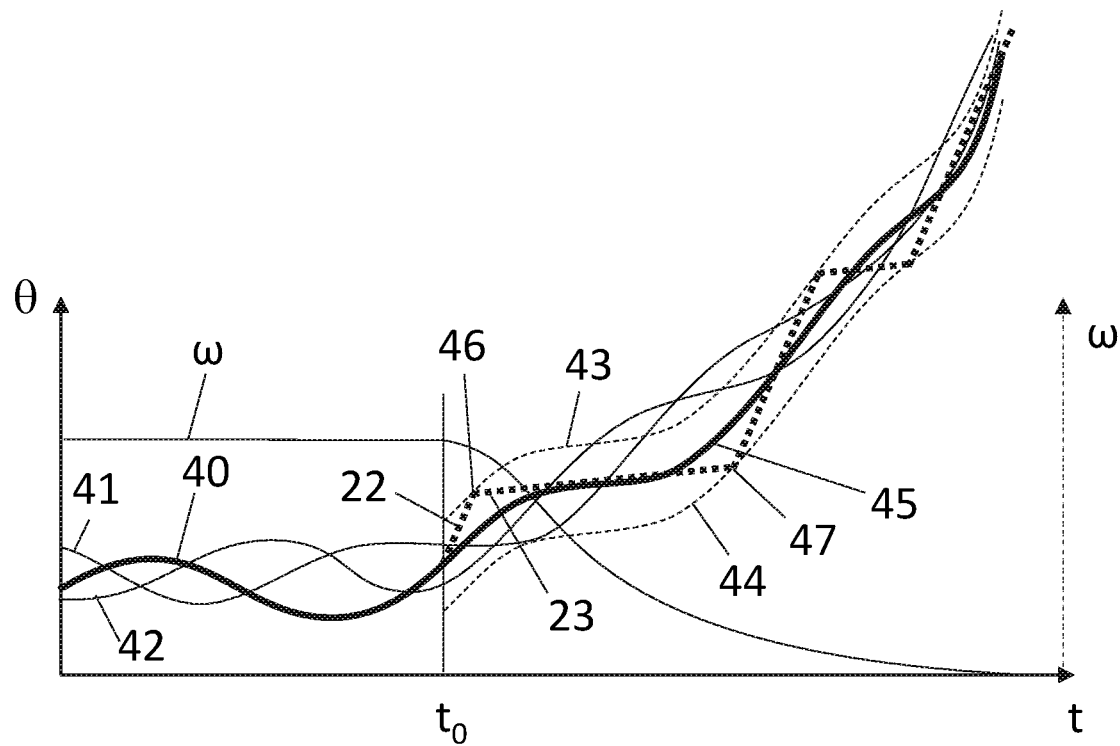

FIG. 3 illustrates a schematic embodiment of a stopping process, where a stop controller is controlling the pitch adjustable rotor blades towards a feathering position upon receiving a rotor stop signal. In the illustrated example, the turbine is operated to follow a common pitch, θcom, reference during operation. At time to, a stop signal is received by the stop controller, after which in a stopping process, the turbine is instructed to follow a common pitch trajectory defined by desired common pitch angles of the stopping process. FIG. 4 illustrates another embodiment where the turbine is instructed to follow individual pitch trajectories defined by desired individual pitch angles of the stopping process.

In the example of FIG. 3, the desired pitch angles define a pitch trajectory 30 with a first stage with a high mean pitch rate and a second stage with a lower mean pitch rate.

The figure further shows the rotor speed, showing that the turbine is operated at rated speed until the rotor stop signal is received at to, after which the rotor speed decreases towards zero. The rotor speed merely indicates the general behaviour of the rotor speed and not the exact rotor speed that would match the illustrated pitch angles.

The stop controller 20 comprises a computing module 24 being implemented to access desired pitch angles 25 (shown as 30 on FIG. 3) of the stopping process and add an envelope band 26 to the desired pitch angles by adding a positive value and a negative value thereby defining an upper band value 31 and a lower band value 32. With the band defined, the stop controller is arranged to:

move the pitch adjustable rotor blade at a selected pitch rate 22, 23 among the number of pre-set pitch rates until the pitch angle signal is outside a pitch angle value defined by the envelope band, if the pitch angle signal is larger than the upper band value, change the selected pitch rate to a lower pitch rate among the number of pre-set pitch rates, and if the pitch angle signal is smaller than the lower band value, change the selected pitch rate to a higher pitch rate among the number of pre-set pitch rates.

In the example of FIG. 3, the stop controller is arranged to pitch the blades at two pre-set pitch rates, a first high pitch rate 22 and a second low pitch rate 23. The pitch rates may be set in accordance with a given design. The first pitch rate may be between 3 and 15°/s, whereas the second lower pitch rate may be between 0 and 5°/s. Other rates may be set, including negative rates.

Upon receipt of the rotor stop signal at to, all pitch blades are moved at the high pitch rate 22. While moving the blades, as schematically illustrated in FIG. 2, the pitch angle signal is compared 26 to the envelope band and once it its detected that pitch angle signal is larger 33 than the upper band value, the selected pitch rate is changed to the low pitch rate 23. The comparison is maintained during the stopping process, so once the pitch angle signal is detected to be smaller 34 than the lower band value, the low pitch rate 23 is changed to the high pitch rate 22. This logic is kept running during the stopping process. In this regard it is noted that the logic allows the stop controller to follow (in an approximate manner) any desired pitch trajectory.

FIG. 4 illustrates a schematic general embodiment. Like FIG. 3 the figure illustrates an example of a stopping process, where a stop controller is controlling the pitch adjustable rotor blades towards a feathering position upon receiving a rotor stop signal. In contrast to FIG. 3, the turbine is operated to follow individual (possibly cyclic) pitching of pitch adjustable rotor blades, both before and after the time to where the stop signal is received by the stop controller. Thus, during the stopping process, the turbine is instructed to follow individual pitch trajectories defined by desired pitch angles of each of the pitch adjustable rotor blades.

FIG. 4 illustrates three pitch trajectories 40, 41 and 42, however for sake of simplicity only one of the pitch trajectories 40 is discussed in terms of the embodiments. It is to be understood that same aspects are also relevant for the two other trajectories 41, 42.

In connection with the embodiment shown on FIG. 4, the stop controller 20 is implemented to follow the same general steps as for the embodiment of FIG. 3, namely to access desired pitch angles 25, 45 of the stopping process and add an envelope band 26 to the desired pitch angles by adding a positive value and a negative value thereby defining an upper band value 43 and a lower band value 44. With the band defined, the stop controller is arranged to:

move the pitch adjustable rotor blade at a selected pitch rate among the number of pre-set pitch rates until the pitch angle signal is outside a pitch angle value defined by the envelope band, if the pitch angle signal is larger than the upper band value, change the selected pitch rate to a lower pitch rate among the number of pre-set pitch rates, and if the pitch angle signal is smaller than the lower band value, change the selected pitch rate to a higher pitch rate among the number of pre-set pitch rates.

Figure 5:
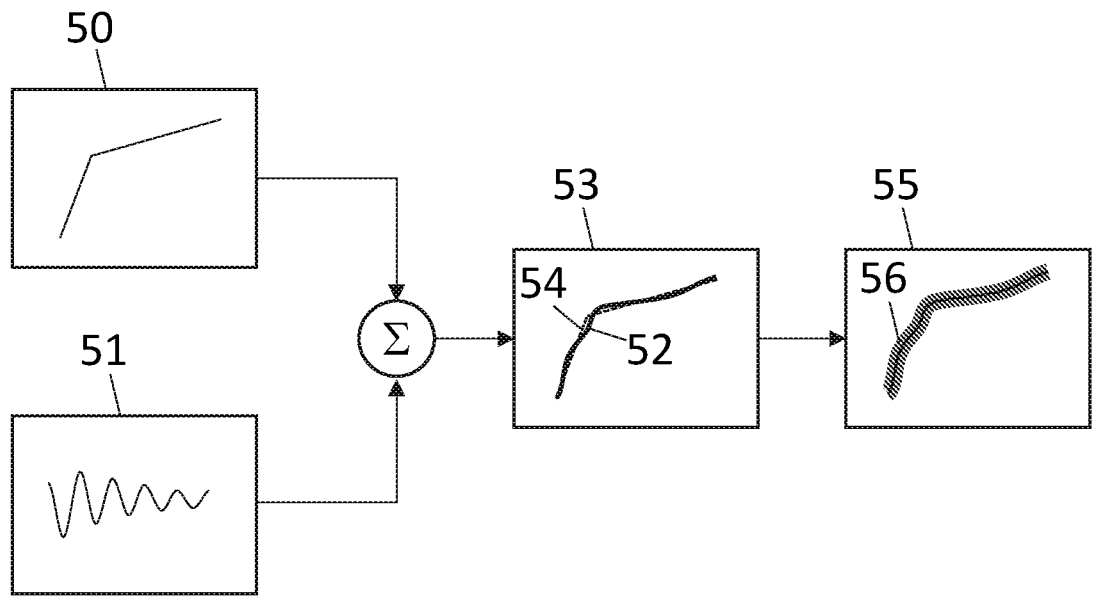
FIG. 5 illustrates an embodiment, where the desired pitch angles are based on a super-position of a desired collective pitch angle setting and a desired individual pitch angle setting.

In the example of FIG. 4, the stop controller is, like for FIG. 3, arranged to pitch the blades at two pre-set pitch rates, a first high pitch rate 22 and a second low pitch rate 23. The desired pitch angles as defined by the curve 45 is shown as an increasing oscillating trajectory. FIG. 5 illustrate an embodiment of how such desired individual pitch trajectory can be determined.

Upon receipt of the rotor stop signal at to, the pitch blade is moved at the high pitch rate 22. As mention above in connection with the embodiments of FIGS. 2 and 3, while moving the blades towards feathering, the pitch angle signal is compared to the envelope band and once it its detected that pitch angle signal is larger 46 than the upper band value, the selected pitch rate is changed to the low pitch rate 23. The comparison is maintained during the stopping process, and once the pitch angle signal is detected to be smaller 47 than the lower band value, the low pitch rate 23 is changed to the high pitch rate 22. This logic is kept running during the stopping process.

While not shown, similar to the illustrated band defined by the boundaries 43, 44, two other bands are present, one for each of the two pitch trajectories 41, 42. FIG. 4 thus illustrates an example embodiment where the stop controller is arranged to move each of the one or more pitch adjustable rotor blades individually in accordance with the pitch angles defined by the envelope band.

The desired pitch angles of the stopping process, that is the pitch trajectory used for the stopping process, can be generated in different manners.

FIG. 5 illustrates an advantageous embodiment, where the stop controller is implemented in a manner so that the desired pitch angles are based on a desired collective pitch angle setting and a desired individual pitch angle setting.

As schematically shown in FIG. 5, the desired pitch angles are split in a desired collective pitch angle setting as shown by the box 50, and a desired individual pitch angle setting as shown by the box 51. Basing a pitch angle setting on a combination of a collective part and an individual part is a common practice for setting a pitch angle. In a stopping process, the common pitch angle setting can be used to control the rotor speed reduction and thrust issues, whereas the individual pitch angle setting can be used to mitigate asymmetric loads on the rotor during the stopping process and tower vibrations.

This embodiment can be used for determining the desired pitch angles of any of the examples of FIGS. 3 and 4. In the embodiment of FIG. 3, the desired pitch angles may be determined by setting the desired individual pitch angles as zero. In the embodiment of FIG. 4, the desired pitch angles may be implemented by setting the desired collective pitch angle as zero.

As illustrated in FIG. 5, the collective pitch angle setting and individual pitch angle settings are summed resulting in the desired pitch trajectory 52, as shown in box 53, showing the super-imposed pitch trajectory 52. The collective pitch trajectory 54 is also shown for illustrative purposes.

Finally the envelope band 56 is determined to follow the desired pitch angles of the super-imposed trajectory.

FIGS. 3 and 4 illustrate examples where the desired pitch angles are defined for the entire duration of the stopping process, that is for the entire stopping pitch trajectory. In one embodiment, the desired pitch angles are predefined for the entire duration of the stopping process. That is, the stop controller accesses or generates the desired pitch angles upon receipt of the stopping signal and generates the desired pitch angles for the entire stopping process.

In an embodiment, the desired pitch angles are determined during the stopping process. That is the desired pitch angles are determined while the rotor is stopping. This determination may be based on a time duration or sensor input. Such sensor input may relate to such parameters as rotor acceleration, rotor speed, tower top movement, blade load, thrust, wind speed, wind direction, etc.

For example, with reference to FIG. 3, the specific slopes of the linear segments 30 of the desired pitch angles may be determined based on input. Also the timing of the shift between the first high mean pitch rate, to the second lower mean pitch may be based on input. As an example, this shift may be done in view of the rotor acceleration, in an embodiment the high mean pitch rate may be used until the rotor acceleration is zero, at which point a shift to the lower mean pitch rate is done. Another example could relate to the thrust acting on the rotor, for example based on rotor speed and blade load, a thrust value can be determined, and used for setting the mean pitch rate. In this regard, a negative pitch rate may even be applied in order to temporary increase the thrust on the rotor. Such a temporary thrust increase may mitigate undesired forward bending of the tower.

The purpose of stopping the rotor is (naturally) to reduce the rotor speed. Reduction of rotor speed is done by pitch the blades outwards towards the feathering position. Application of varying individual pitch activity during the stopping process is normally done for load reducing purposes, e.g. either to mitigate an asymmetric loading on the rotor or to mitigate tower vibrations. In an embodiment, individual pitch activity during the stopping process is only done if the need is sufficiently strong. By only using individual pitching if needed, the wear on the pitch actuators can be reduced. In an embodiment the desired individual pitch angle setting is only applied if a required magnitude is above a threshold. The required magnitude may be calculated based on blade load signals or tower acceleration signals. The magnitude could be the amplitude of an oscillating signal on which the individual pitching is based.

As can be seen on FIG. 4, when applying individual pitching in the period up to receiving the stop signal, the specific pitch angles of the individual blades will be different at time to.

In embodiments, the desired pitch angles of the stopping process may be selected for each pitch adjustable blade, however they may also be selected to be the same for all pitch adjustable blade. If selected to be the same, the pitch angles of each of the blade may still be different during the stopping process due to the starting angles may be different. In embodiments where the desired pitch angles are selected to be the same for all blades, depending on the specific pitch angle of the blade at to, some pitch angles at to may fall outside the resulting envelope band, and some may fall inside the resulting envelope band. A schematic example of this is shown on FIG. 6 with reference 60.

In an embodiment, upon receipt of the stop signal, the pitch adjustable rotor blades with a pitch angle inside the envelope band or a pitch angle lower than the lower band value are set to move with the highest pitch rate among the number of pre-set approximately constant pitch rates, and the pitch adjustable rotor blades with a pitch angle larger than the upper band value are set to move with the lowest pitch rate among the number of pre-set pitch rates. In this manner it can be ensured that while the pitch angle initially is outside the envelope band, the pitch angle will after a short period of time fall inside the band. This embodiment may also be implemented for systems where the desired pitch angles are selected for each pitch adjustable blade, since it will just lead to that such blades are always initially pitched with the highest pitch rate.

Figure 6:
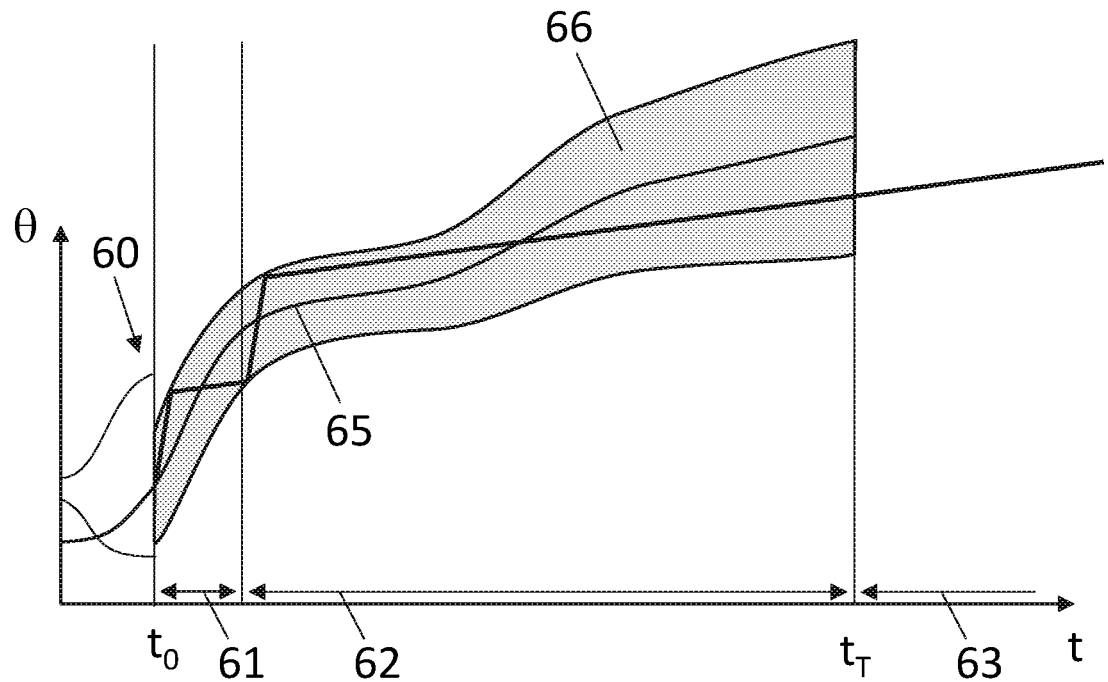
FIGS. 6 and 7 illustrate further embodiments of the stopping process.

FIG. 6 illustrates another pitch trajectory to show further embodiments of the invention.

In the figure, three varying pitch trajectories are illustrated in the period before to. In the periods following $t_0$, 61-63, only a single pitch trajectory and a single envelope band is shown. This is for illustrative reasons, as further envelope bands may be present in agreement with the various embodiments.

Upon receiving the rotor stop signal, desired pitch angles 65 are accessed and the envelope band 66 determined. In the illustrated embodiment the band width of the envelope band is changed during the stopping process. The changing of the band width may be done in different manners, examples includes at specific points in the stopping process or progressively as the stopping process is progressing. In the illustrated embodiment, the band width is progressively widened as the stopping process progresses. It may also be envisioned to apply a first bandwidth in a first stage 61 with a high mean pitch rate and a larger bandwidth in a later stage 62 with a lower mean pitch rate. In general the band width may be widened as the rotor speed decreases as the need for tight control of the stopping process may be less for a slowly revolving rotor. In addition to the rotor speed, also such parameters as pitch angle, pitch velocity and pitch acceleration may be used.

FIG. 6 further illustrates an embodiment wherein upon reaching a termination criterion, the pitch angle is controlled to pitch the blades at one of the pre-set pitch rates without taking the envelope band into account. Here the low pitch rate is used, and only a single pitch rate is shown to be applied in the period 63 after the termination criterion has been reached. The termination criterion includes the rotor speed, pitch angle, pitch velocity and pitch acceleration.

Figure 7:
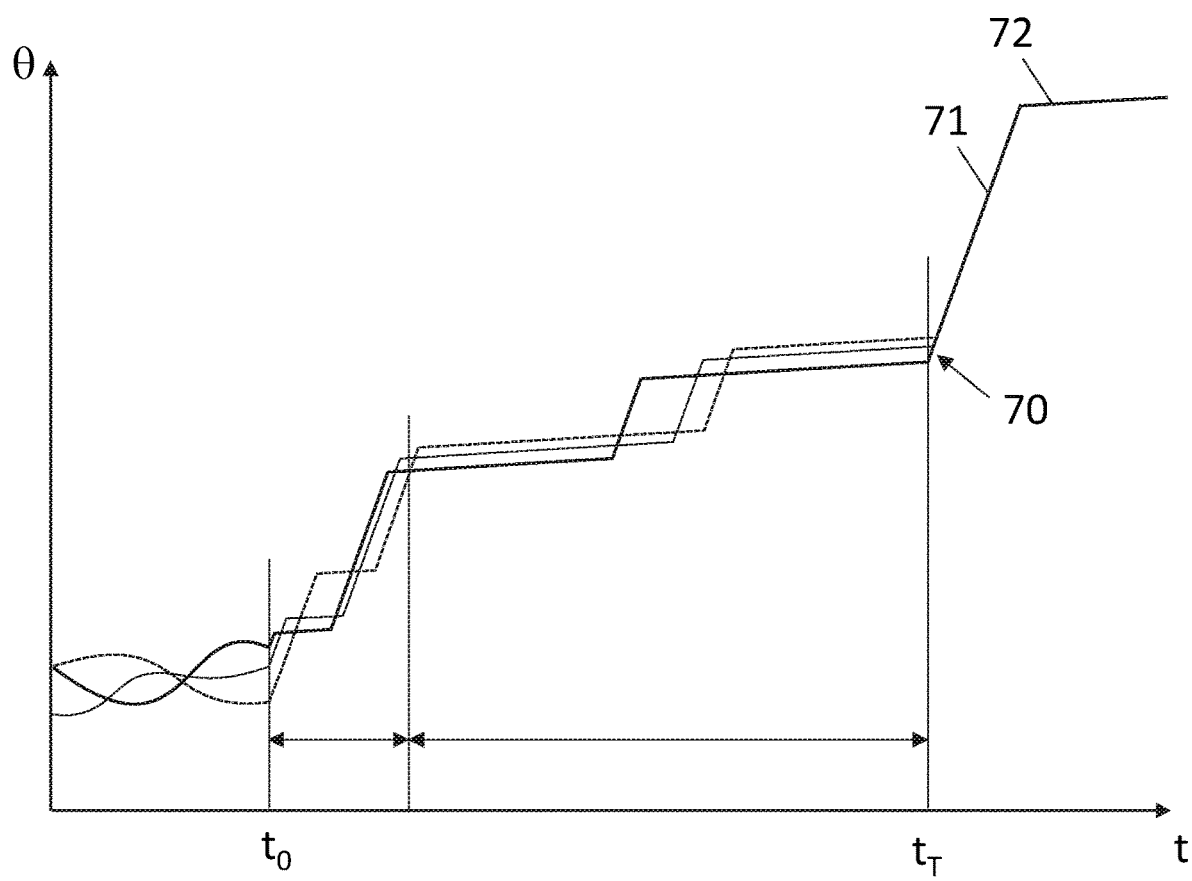

FIG. 7 illustrates a further embodiment of a stopping process. In addition to FIG. 6 two further embodiments are illustrated. Individually pitched blades will normally not follow the same pitch trajectory, and therefore at different times, the blades will have different pitch angles. FIG. 7 illustrates an embodiment where, upon reaching the termination criterion at time $t_T$, the pitch angles are in a first process controlled to align 70 all pitch angles, and in a second process controlled to pitch at the same pitch rate 71. FIG. 7 further illustrates than after the termination criterion has been reached, the pitch rate for the blades may be changed. For example, a pitch rate 71 may be selected to ensure a fast decrease in rotational speed to get the rotor to a an almost complete halt as fast as possible, but as the pitch angle get close to the end-stop, a slow final pitch 72 rate may be applied to reduce the mechanic impact as the blades reaches the end-stop.

In the illustrated embodiments only two pitch rates have been shown, and the possibility of a negative pitch rate has been mentioned. In general it is understood that more pitch rates may be implemented. Naturally the fewer pitch rates, the simpler the pitch actuation system is needed. However, with more pitch rates available, the more closely can a given pitch trajectory be followed, and there may be situations where 3, 4, 5 or even more pitch rates are available.

The stop controller may be based on generic or standard industrial computing equipment, however it may advantageously alternatively be based on safety computing equipment; that is, on a safety controller. While the safety controller in an embodiment may be a safety certifiable controller, it needs not be safety certified but rather a controller based on rigorously tested software and hardware fulfilling the same or similar requirements as those needed for a certification. Such type of controller may also be referred to as a safety certifiable controller. Typically, the safety-related part of the control system may be constructed according to the principles given in recognized standards for functional safety. Such standards encompass e.g. ISO 13849, IEC 61508, and IEC 62061. Besides from fulfilling specific, quantitative requirements to reliability and diagnostic coverage, systems constructed according to these standards are assumed to be free of systematic failures such as software defects. The control system may thus be split into a normal control domain which perform the calculating tasks using standard computing equipment, and a safety control domain which performs the calculating tasks using safety-related computing equipment.

In an advantageous embodiment, the rotor stop signal is generated by a safety controller. In this manner it can be ensured that high reliability of the safety controller is used to control the stopping of the rotor.

In an advantageous embodiment, the generation of the rotor stop signal is triggered by a safety controller upon occurrence of a fault signal. The fault signal may originate from sensors also placed in the safe domain, but need not be.

In an embodiment the desired pitch angles of the stopping process are determined based on a stored pitch angle signal. Prior to receipt of the rotor stop signal, the stored pitch angle signals are generated by storing pitch angle signals for each of the pitch adjustable rotor blades for at least a fraction of a rotor revolution, such as between 0.5 and 1.5 revolution. It may be advantageous to utilize at least one revolution to obtain the IP signal component. In an embodiment, the at least a fraction of a rotor revolution is substantially one rotor revolution.

In this embodiment, either prior to receipt of the rotor stop signal, or upon receipt of the rotor stop signal, at least one periodic component of the stored signal is determined. This periodic component may advantageously be determined using a Fourier transform routine, including a discrete Fourier transform.

In this manner upon receipt of the rotor stop signal, the controlling of the pitch adjustable rotor blades towards a feathering position is done using a pitch control signal containing the at least one periodic component.

In an embodiment the stored pitch signal may be based on a function of rotor azimuth angle. Using a pitch signal as a function of azimuth angle is advantageous as the signal synthesis becomes agnostic to the rotor speed, while still synthesizing n-P-components correctly.

Basing the desired pitch angles of the stopping process on a stored pitch angle signal in accordance with this embodiment is advantageous since the individual pitching that was activated prior to receiving the rotor stop signal can be maintained, at least to a certain degree, during the stopping process where the pitch adjustable rotor blades are moved towards a feathering position.

Example embodiments of the invention have been described for the purposes of illustration only, and not to limit the scope of the invention as defined in the accompanying claims.

The invention claimed is:

1. A method for controlling a wind turbine, the wind turbine comprises a rotor with one or more pitch adjustable rotor blades and a stop controller configured to control the one or more pitch adjustable rotor blades towards a feathering position in response to a rotor stop signal as part of a stopping process that reduces speed of the rotor, and wherein the stop controller is arranged to pitch the one or more pitch adjustable rotor blades at a number of pre-set pitch rates including a first pitch rate and a second pitch rate, the second pitch rate being lower than the first pitch rate, wherein the method comprises:

accessing desired pitch angles of the stopping process, the desired pitch angles defining a pitch trajectory across an entire duration of the stopping process;

defining an envelope band of the pitch trajectory by adding positive values and negative values to the desired pitch angles, thereby defining an upper band and a lower band of the pitch trajectory across the entire duration, or until a termination criterion has been reached; and operating the stop controller to:
move the one or more pitch adjustable rotor blades at a selected pitch rate among the number of pre-set pitch rates until a pitch angle signal is outside a pitch angle value defined by the envelope band such that:
when the pitch angle signal is larger than the upper band at a specific time, the selected pitch rate is changed to the second pitch rate; and
when the pitch angle signal is smaller than the lower band at a specific time, the selected pitch rate is changed to the first pitch rate.

2. The method of claim 1, wherein the stop controller is arranged to move each of the one or more pitch adjustable rotor blades individually in accordance with the pitch angles defined by the envelope band.

3. The method of claim 1, wherein the desired pitch angles are based on a desired collective pitch angle setting and a desired individual pitch angle setting.

4. The method of claim 3, wherein the desired individual pitch angle setting is only applied if a required magnitude is above a threshold.

5. The method of claim 1, wherein the desired pitch angles are predefined for the entire duration of the stopping process.

6. The method of claim 1, wherein the desired pitch angles are determined during the stopping process.

7. The method of claim 6, wherein the desired pitch angles are determined based on a time duration or sensor input.

8. The method of claim 1, wherein upon receipt of the rotor stop signal at the stop controller, the one or more pitch adjustable rotor blades with a pitch angle inside the envelope band or a pitch angle lower than the lower band are set to move with a highest pitch rate among the number of pre-set pitch rates, and the one or more pitch adjustable rotor blades with a pitch angle larger than the upper band are set to move with a lowest pitch rate among the number of pre-set pitch rates.

9. The method of claim 1, wherein a band width of the envelope band is changed, either at specified times in the stopping process or progressively as the stopping process is progressing.

10. The method of claim 1, wherein upon reaching the termination criterion in the stopping process, the pitch angle is controlled to pitch the one or more pitch adjustable blades at one of the pre-set pitch rates without taking the envelope band into account.

11. The method of claim 10, wherein the pitch angles are in a first process controlled to align all pitch angles, and in a second process controlled to pitch at a same pitch rate.

12. The method of claim 1 wherein the stop controller is implemented as a safety controller.

13. The method of claim 1 wherein the desired pitch angles of the stopping process are determined based on a stored pitch angle signal, wherein operating the stop controller further comprises:
prior to receipt of the rotor stop signal, generating the stored pitch angle signal using pitch angle signals for each of the one or more pitch adjustable rotor blades for at least a fraction of a rotor revolution;

either prior to receipt of the rotor stop signal, or upon receipt of the rotor stop signal, determining at least one periodic component of the stored pitch angle signal; and after determining the at least one periodic component, implementing the stopping process by controlling the one or more pitch adjustable rotor blades towards the feathering position using a pitch control signal containing the at least one periodic component.

14. A wind turbine comprising a control system and a rotor with one or more pitch adjustable rotor blades, the control system being arranged for controlling the wind turbine in response to a rotor stop signal, wherein the control system comprises:

a stop controller arranged for controlling the one or more pitch adjustable rotor blades towards a feathering position in response to the rotor stop signal as part of a stopping process, and wherein the stop controller is arranged to pitch the one or more pitch adjustable rotor blades at a number of pre-set pitch rates including a first pitch rate and a second pitch rate, the second pitch rate being lower than the first pitch rate;

wherein the stop controller is arranged to:
access desired pitch angles of the stopping process, the desired pitch angles defining a pitch trajectory across an entire duration of the stopping process;
define an envelope band of the pitch trajectory by adding positive values and negative values to the desired pitch angles, thereby defining an upper band and a lower band of the pitch trajectory across the entire duration, or until a termination criterion has been reached;
move the one or more pitch adjustable rotor blades at a selected pitch rate among the number of pre-set pitch rates until a pitch angle signal is outside a pitch angle value defined by the envelope band such that:
when the pitch angle signal is larger than the upper band at a specific time, the selected pitch rate is changed to the second pitch rate; and
when the pitch angle signal is smaller than the lower band at a specific time, the selected pitch rate is changed to the first pitch rate.

15. The wind turbine of claim 14, wherein the stop controller is arranged to move each of the one or more pitch adjustable rotor blades individually in accordance with the pitch angles defined by the envelope band.

16. The wind turbine of claim 14, wherein the desired pitch angles are based on a desired collective pitch angle setting and a desired individual pitch angle setting.

17. The wind turbine of claim 16, wherein the desired individual pitch angle setting is only applied if a required magnitude is above a threshold.

18. A computer program product comprising a non-transitory computer readable medium having software code which, is adapted to control a wind turbine comprising a rotor with one or more pitch adjustable rotor blades, the computer program product being adapted to perform an operation for controlling the wind turbine, the operation comprising:

implementing a stopping process by a stop controller in response to a rotor stop signal, the stopping process reducing speed of the rotor by controlling the one or more pitch adjustable rotor blades towards a feathering position at a number of pre-set pitch rates including a first pitch rate and a second pitch rate, the second pitch rate being lower than the first pitch rate, wherein the stop controller is configured to:
access desired pitch angles of the stopping process, the desired pitch angles defining a pitch trajectory across an entire duration of the stopping process;
define an envelope band of the pitch trajectory by adding positive values and negative values thereby defining an upper band and a lower band of the pitch trajectory across the entire duration, or until a termination criterion has been reached; and
move the one or more pitch adjustable rotor blades at a selected pitch rate among the number of pre-set pitch rates until a pitch angle signal is outside a pitch angle value defined by the envelope band such that:
when the pitch angle signal is larger than the upper band at a specific time, the selected pitch rate is changed to the second pitch rate; and
when the pitch angle signal is smaller than the lower band at a specific time, the selected pitch rate is changed to the first pitch rate.

19. The computer program product of claim 18, wherein the stop controller is arranged to move each of the one or more pitch adjustable rotor blades individually in accordance with the pitch angles defined by the envelope band.

* * * * *